United States Patent [19]
Pomatto

[11] Patent Number: 5,694,329
[45] Date of Patent: Dec. 2, 1997

[54] POWER DISTRIBUTION SYSTEM CONTROL NETWORK

[75] Inventor: Lawrence A. Pomatto, Santa Ana, Calif.

[73] Assignee: Systems Analysis & Integration, Inc., Orange, Calif.

[21] Appl. No.: 743,126

[22] Filed: Nov. 1, 1996

Related U.S. Application Data

[63] Continuation of Ser. No. 603,609, Feb. 20, 1996, Pat. No. 5,608,646, which is a continuation of Ser. No. 180,921, Jan. 11, 1994, Pat. No. 5,517,423.

[51] Int. Cl.$^6$ ............................................. G01R 21/00
[52] U.S. Cl. .............................. 364/492; 324/76.11
[58] Field of Search .............................. 364/492, 550, 364/481, 487; 307/11, 20, 22, 24, 34, 112, 132 E, 139, 31; 324/76.11, 111; 395/750

[56] References Cited

U.S. PATENT DOCUMENTS

| | | |
|---|---|---|
| 3,702,460 | 11/1972 | Blose . |
| 4,075,699 | 2/1978 | Schneider et al. . |
| 4,315,251 | 2/1982 | Robinson et al. . |
| 4,359,644 | 11/1982 | Foord . |
| 4,396,915 | 8/1983 | Farnsworth et al. . |
| 4,672,555 | 6/1987 | Hart et al. . |
| 4,745,512 | 5/1988 | Hampson . |
| 4,777,381 | 10/1988 | Fernandes . |
| 4,803,635 | 2/1989 | Andow . |
| 4,847,780 | 7/1989 | Gilker et al. . |
| 4,868,410 | 9/1989 | Nakamura . |
| 5,006,846 | 4/1991 | Granville et al. . |
| 5,179,376 | 1/1993 | Pomatto . |

OTHER PUBLICATIONS

AC Current Probe Model JM810, AEMC Instrument User Manual & Specification, Jul. 1988.
Clip–On Current Transformer 1000/1, AEMC Corporation, Specification Sheet Feb. 1983.
F.W. Bell High Frequency Current Sensor, Model IH–150, (probably published in 1987).

*Primary Examiner*—Emanuel T. Voeltz
*Assistant Examiner*—Thomas Peeso
*Attorney, Agent, or Firm*—Knobbe, Martens, Olson & Bear, LLP

[57] ABSTRACT

The power distribution control system of the present invention provides a distributed intelligence, data acquisition and control system which collects and analyzes large amounts of data representing power usage from a power distribution substation and remote control units spread throughout a power distribution network. The system also provides the capability of various control functions for the substation and remote locations such as capacitor banks and pole switches along a distribution line. The system provide communications capabilities between local devices and also with remote control units. The system provides real time monitoring of power usage and real time control of various functions in the power distribution network.

15 Claims, 7 Drawing Sheets

POWER DISTRIBUTION SYSTEM CONTROL NETWORK

This application is a continuation of U.S. patent application Ser. No. 08/603,609, filed Feb. 20, 1996, now U.S. Pat. No. 5,608,646 which was a continuation of U.S. patent application Ser. No. 08/180,921, filed Jan. 11, 1994, now U.S. Pat No. 5,517,423.

BACKGROUND OF THE INVENTION

1. Field of the Invention

The present invention relates to improvements in control in a power distribution system. Specifically, the invention involves a distributed network for automatically controlling a power distribution system.

2. Description of the Related Art

In power distribution systems, there are generally transmission and distribution circuits, transformers, circuit breakers, capacitor banks, pole top switches, and other electrical equipment (hereinafter "power equipment") which cooperate to deliver electrical power. The power equipment requires control to properly manage the power system. For instance, the various pieces of electrical equipment, including the circuits and transformers, are protected for overload and fault conditions by monitoring the current in each phase of the equipment. Upon detection of an overload or fault, the protection equipment trips (open) the appropriate breakers to terminate the fault. The capacitor banks spread throughout the power distribution network are used to regulate the load on the distribution lines. If a distribution line becomes inefficient by becoming too inductive or capacitive, capacitance can be added or removed using the capacitor banks. Pole top switches and other electrical equipment also require control in regulating loads and in controlling the power distribution system.

The various components of a power distribution network such as the capacitor banks, the circuit breakers, the pole top switches, and the substation control systems are generally discrete systems, with control being inefficient because of the discontinuity caused by physical separation and non-uniform monitoring.

Some improved automatic discrete monitoring systems have been proposed, such as the power transmission line monitoring system proposed in U.S. Pat. No. 5,006,846. However, even computer controlled monitoring systems generally address one aspect of the power distribution network.

SUMMARY OF THE INVENTION

Applicant recognized that a distributed intelligence control system, where controllers for each aspect of control in a power distribution network monitor and control the local power equipment and further communicate with other controllers in the system to coordinate control, would increase efficient use of power, as well as efficient use of manpower to control the power distribution network.

Therefore, the present invention involves an interconnected, distributed, data acquisition and control system for power distribution systems. In particular, the invention involves a plurality of controllers associated with the various pieces of power equipment in the distribution network. In a preferred embodiment, the controllers have individual capabilities for local monitoring and control, as well as the ability to communicate and coordinate with other controllers in the power distribution network. For instance, in one embodiment, a controller would be provided for each capacitor bank, for each the pole top switch, and for each power distribution substation in the power distribution network.

Each controller could have local monitoring and control capabilities as well as the communication abilities to coordinate its control and monitoring tasks with the other controllers in the power distribution network. By communicating with other controllers, the control system for the power distribution network can more effectively coordinate the control and regulation of power in the distribution network.

Preferably, at least some of the controllers are configured to monitor an associated power distribution line for parameters such as line voltage, line current, watts, volt amperes reactive (VARs), power factor (PF) and other important parameters as further explained herein.

In one embodiment, information collected from the distributed controllers is in whole or in part transmitted to the utility company's remote office, to facilitate central access to power usage information and control of the power distribution network.

One aspect of the present invention involves a control network for use in a power distribution system having one or more power distribution subsystems. The control network has at least one system controller and a plurality of control units distributed at control locations throughout the power distribution network, at least some of the plurality of control units are in communication with other of the control units and with the system controller to provide coordinated control for the power distribution system.

In one embodiment, the control network further has a central computer in communication with the system controller. The central computer preferably collects data from the system controller representing information collected by the system controller from the plurality of distributed control units.

In a further embodiment, the plurality of controllers comprise at least one substation data acquisition controller which monitors power equipment at a substation within the power distribution system, and at least one pole switch controller located at a distribution pole. The pole switch controller responds to and is in communication with one or more of the at least one substation data acquisition controller and the at least one system controller to control a switch on the distribution pole.

In yet another embodiment, the plurality of controllers comprise at least one substation data acquisition controller which monitors power equipment at a substation within the power distribution system, and at least one capacitor controller in communication with and responsive to one or more of the at least one substation data acquisition controller and the at least one system controller to control at least one capacitor in a capacitor bank in the power distribution system. In addition, the plurality of controllers can further include, in addition to the capacitor controller, at least one pole switch controller located at a distribution pole. The pole switch controller responds to and is in communication with one or more of the at least one substation data acquisition controller and the at least one system controller to control a switch on the distribution pole.

According to a further aspect of the present invention, the system controller comprises at least one first pole switch controller located at a first distribution pole which monitors the power equipment at the distribution pole, and the plurality of controllers comprise at least one second pole switch controller located at a second distribution pole separate from the first distribution pole. The second pole switch controller responds to and is in communication with the at least one first pole switch controller to control a switch on the second distribution pole.

Similarly, in one embodiment, the system controller comprises at least one first capacitor controller which monitors associated power equipment, and the plurality of controllers comprise at least one second capacitor controller. The second capacitor controller is responsive to and in communication with the first capacitor controller to control at least one capacitor in the power distribution system.

Preferably, the system controller and the plurality of control units communicate over a communications network. The network may involve a radio transceiver interface and a radio transceiver, a serial communications modem, and other communications links for remote communications between control units.

DETAILED DESCRIPTION OF THE PREFERRED EMBODIMENT

Figure 1:
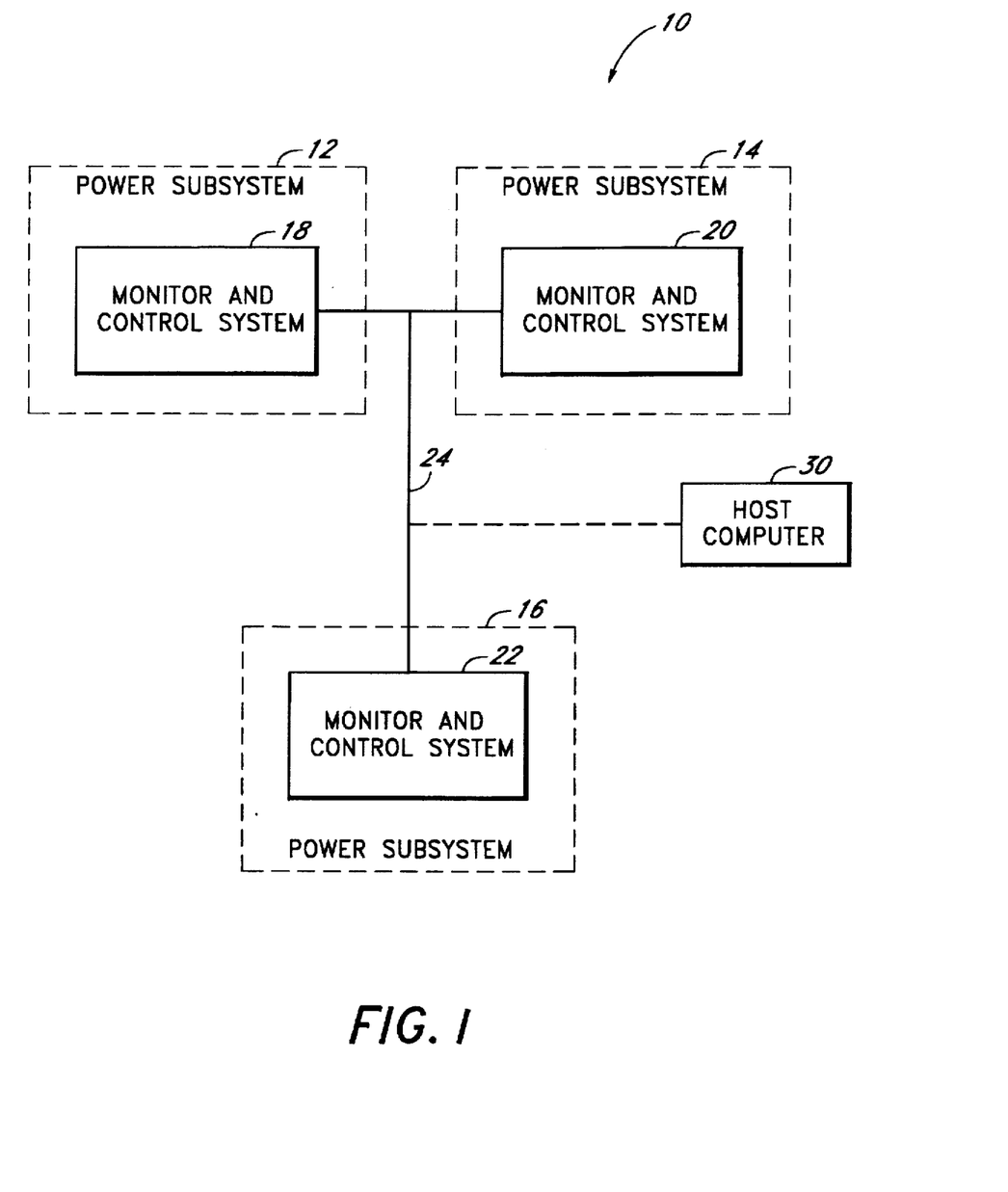
FIG. 1 is a general block diagram of the control network for a power distribution system in accordance with the present invention.

FIG. 1 depicts the overall block diagram of the network of the present invention. FIG. 1 depicts a power distribution system 10 comprising a plurality of power subsystems 12, 14, and 16. Each power subsystem within a general power distribution system may comprise one or more substations, which distribute power to end users. The depiction of three power subsystems in FIG. 1 is arbitrary, and more or fewer subsystems may exist in a given power distribution network.

According to the present invention, each power subsystem has a monitor and control system or network 18, 20, 22. As depicted in FIG. 1, the first power subsystem 12 has the first monitor and control system 18; the second power subsystem 14 has the second monitor and control system 20; and the third power subsystem 16 has the third monitor and control system 22. Each monitor and control system 18, 20, 22 comprises, in general, a plurality of controllers (some computer-based, some possibly not computer-based), which communicate with one another to properly manage and control the power subsystem.

Each monitor and control system in turn communicates with other monitor and control systems in the power distribution system. For instance, in the power distribution system 10, the first monitor and control system 18 communicates with the second monitor and control system 20 and the third monitor and control system 22. In essence, the monitor and control systems cooperate in their control of their respective power subsystems. Each monitor and control system 18, 20, 22 in the power distribution system 10 communicates over a communication link 24. The communication link may comprise a LAN, a radio communications link, a modem/telephone line link, a fiberoptic link, or any other communications link well understood in the art.

In one embodiment, the monitor and control systems are coupled to a host computer 30 via the communications link 24. In this manner, a central host computer can collect data from one or more power distribution systems and initiate control if desired from the central location.

Figure 2:
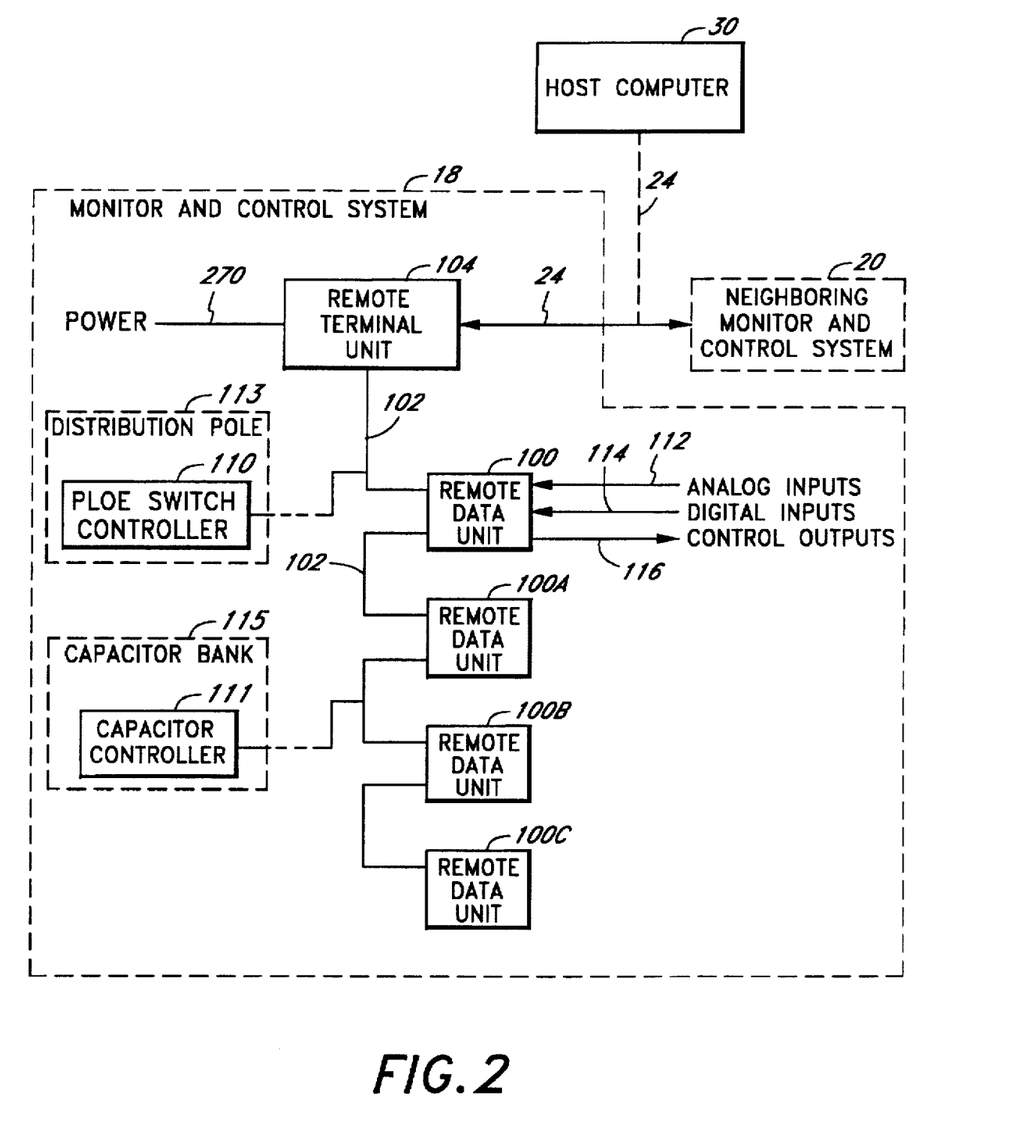
FIG. 2 is a general block diagram of a representative monitor and control system for one power subsystem in the power distribution system.

FIG. 2 depicts an exemplary block diagram of one possible embodiment for the first monitor and control system or network 18 for the power subsystem 12 depicted in FIG. 1. The network depicted comprises a plurality of remote data units (RDUs) 100, 100A, 100B, 100C, which communicate over a communications link 102, such as a LAN, or other communications link as well understood in the art. In one embodiment, the communications link 102 comprises a daisy chain cable which connects the remote data units together and to a remote terminal unit (RTU) 104. The four RDUs 100–100C are shown for illustration purposes. The system may comprise more or fewer RDUs. In addition, the remote data units can be tied together for communication by other means, such as a radio interface, a modem, a fiber optic link, or other communication network.

In the embodiment depicted in FIG. 2, the RTU 104 communicates with the host computer 30 over the communications link 24. The remote terminal unit 104 further communicates with neighboring monitor and control systems, such as the second monitor and control system 20, over the communications link 24. As explained above, this communications link may comprise a LAN, a radio communications link, a modem/telephone line link, a fiber optic link, or any other communications link, as well-understood in the art.

It should be noted that the host computer 30 is not a necessary portion of the overall distributed monitor and control network, but allows the first monitor and control system 18 and other monitor and control systems 20, 22 to transmit information to a central location for collective analysis and control.

The monitor and control system further comprises additional control units that may be remote to the remote data units 100–100C and/or remote terminal unit 104. For instance, as depicted in FIG. 2, an additional control unit may comprise a pole switch controller 110 located at a distribution line pole 113. The pole switch controller 110 may provide monitoring functions of the distribution line similar to a remote data unit, as further described herein. Alternatively, the pole switch controller 110 is a control switch that responds to signals from other control units in the system without microprocessor control or monitoring capabilities. The pole switch controller is coupled to an electrically activated pole switch which can switch a distribution line.

An additional control unit is the capacitor controller 111, which controls a capacitor bank 115 in the distribution network 10. As well-understood in the art, capacitor banks are used to regulate the power line loads to maximize efficiency of power transmission. As with the pole switch controller 110, the capacitor controller 111 may be a microprocessor based device which can collect data (such as a remote data unit configured with control outputs to actuate capacitors into the distribution line) or may simply be a control switch that responds to signals from other control units in the monitor and control system 18 to connect or disconnect a selected capacitor in a distribution line.

It should be understood, that in a given embodiment for the monitor and control system 18, the pole switch controller 110, the capacitor controller 111 and the remote data units 100 may or may not be present. In addition, these control units may be present in numbers greater than those depicted in FIG. 2, depending upon the particular power distribution subsystem under control, and the desire to have distributed control for each of the pieces of power equipment in the power distribution subsystem. The particular configuration provided in FIG. 2 is merely exemplary of an interconnected, distributed intelligence, networked system for control of the power distribution system.

In that the pole switch controller 110 and capacitor controller 111 are often remote from the remote terminal unit 104 or remote data units 100, the communications with the pole switch controller 110 and the capacitor controller 111, and any other controllers which are remote are advantageously accomplished with an interface to the communications link 102 that facilitates efficient remote communications (e.g., a packet radio or telephone line/modem interface).

The Remote Data Units

The remote data units 100-100C provide the basic intelligent data acquisition and control units remotely distributed throughout each monitor and control system. Each remote data unit can be configured depending upon the particular application. For instance, as described above, the capacitor controller 111 could be a remote data unit programmed to operate as a capacitor controller 111. Similarly, a remote data unit could be configured to operate as a pole switch controller 110. The basic configuration of a remote data unit is described below.

Figure 3:
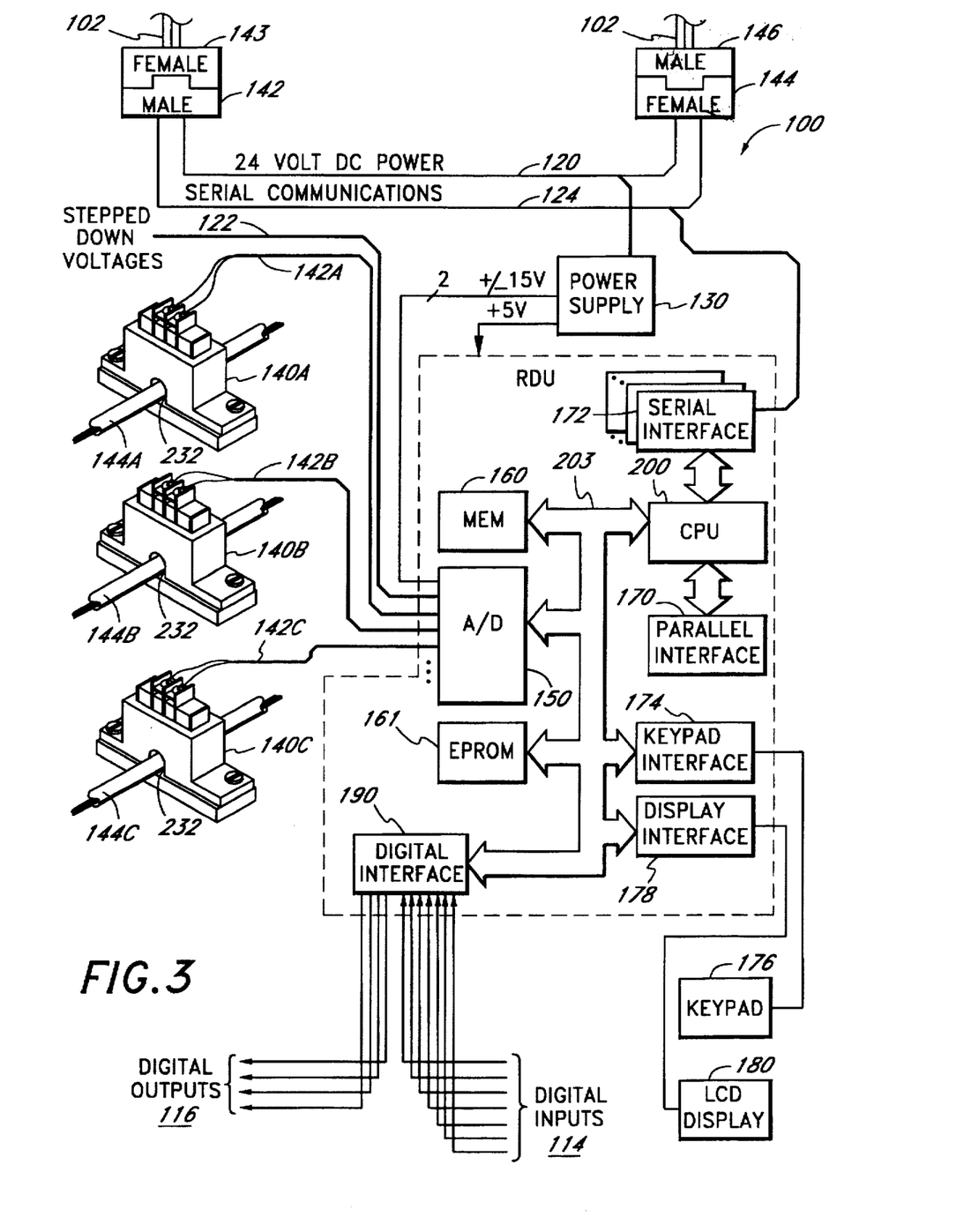
FIG. 3 is a block diagram of an exemplary remote data unit (RDU) in accordance with one aspect of the present invention.

A functional block diagram of an individual remote data unit (RDU) 100 is shown in FIG. 3. Further references to RDU(s) 100 includes any of the RDUs 100–100C. The RDU comprises a microprocessor based controller with control and data acquisition capabilities. In the embodiment depicted in FIG. 3, the RDU 100 is configured for monitoring and control purposes. The RDU 100 samples scaled down analog voltage and current signals proportionally corresponding to values in associated power equipment, and determines values for one or more of the following parameters for the respective power equipment: power factor, watts, volt amperes reactive (vars), voltage and amperes. Each RDU 100 also has the capability to communicate with other RDU's pole switch controllers 110 and capacitor controllers 111 to correlate monitoring and control functions.

The RDU 100 shown in FIG. 3 illustrates an exemplary structure for each of the RDUs 100, 100A, 100B, and 100C of FIG. 2. The RDU 100 comprises a power supply 130, which provides +5 and ±15 volts DC for other elements in the RDU 100, a multi-channel analog to digital (A/D) converter 150, a CMOS memory 160, an EPROM memory 161, a plurality of serial interfaces 172 and a parallel interface 170. A microprocessor based central processing unit (CPU) 200 provides control for the RDU 100, and a memory mapped digital input/output (I/O) interface 190 provides further monitoring and control capabilities for the substation on the digital input lines 114 and the digital output lines 116. Clamp-on current transformers (CTs) 140A, 140B, 140C, provide analog current sense signals on lines 142A, 142B, 142C to the A-D converter 150 in the embodiment depicted in FIG. 3. Further references to CT(s) 140 includes any of the CTs 140A–140C in the system. It should be noted that other means for providing analog sample currents other than the depicted CTs 140A–140C are known in the art such as transducers or standard current transformers. The CTs 140A–140 are depicted as examples. The clamp-on CTs 140 are described in further detail in U.S. patent application Ser. No. 08/012,280, entitled SUBSTATION LOAD DISTRIBUTION MONITOR SYSTEM, filed Feb. 1, 1993, which is hereby incorporated by reference.

The RDU 100 has a memory mapped keypad interface 174 coupled to a 12-key keypad 176, and a memory mapped display interface 178 coupled to a 2-line liquid crystal display 180. The keypad 176 is used in conjunction with the display to make selections and to enter or change configuration information for the RDU as described herein. Further details about the memory mapped keypad interface are provided in U.S. patent application Ser. No. 08/012,280. The keypad can be used to input a unique address for communications with the associated RDU 100. The address input through the keypad 176 can be stored in the CMOS Memory 160 of the RDU 100. Other configuration information is also input through the keypad 176 and stored in the CMOS memory 160.

In one embodiment, the communications link 102 advantageously comprises an 18-twisted pair cable with overall shield rated at 600 volts. The communications link 102 carries signals for the RDUs 100–100C, for instance, DC power on signal lines 120, and serial communications interface signal lines 124 for communications over, advantageously, a conventional RS-485 multidrop link. In one embodiment, the communications link 102 is connected to each RDU 100 via a quick disconnect female connector 143 and leaves the RDU 100 via a similar male connector 146. The RDU has corresponding male and female connectors 142 and 144. Advantageously, these connectors comprise D-subminiature, 37-pin male and female connectors available from Cinch Corp. of Oak Grove Village, Ill. Other conventional LAN connection techniques are also applicable.

The DC power from the RTU 104 on line 120 serves as a power source for the power supply 130 which comprises conventional ±15 volt and +5 volt power supplies. The power supply 130 distributes power throughout the RDU 100. It should be noted that power for each RDU 100 could be provided in an alternative embodiment through an AC power supply such as 120 volts AC (with appropriate power converters) from a power source other than from the RTU 104.

In order for the RDU 100 to monitor power usage in associated power equipment, the RDU also accepts stepped-down voltages over signal lines 122. These voltages can be provided by standard step-down power transformers to step down the voltage from the power line voltage to a voltage appropriate for an A/D converter 150. If the RDU 100 is monitoring one three-phase power distribution line, then the signal lines 122 carry three low-voltage AC sense signals, one corresponding to each phase of the power distribution line. Advantageously, all of the power and voltage sense signals are metal oxide varistor (MOV) protected.

The A/D converter 150 accepts analog inputs from multiple channels. In the present embodiment, the A/D converter 150 accepts inputs from sixteen-channels. The low voltage sense signals on signal lines 122 enter the A/D converter 150 via signal lines 122. The A/D converter 150 converts the sense signals to digital form upon request by the CPU 200. The digitized values are read by the CPU 200 via a conventional data bus 203 connecting the A/D converter 150 to the CPU 200. In one embodiment, a NEC V25-Plus microprocessor controls the CPU 200 operations. The CPU 200 also includes a real time clock (not shown). A CPU clock (not shown) generates one second interrupts for the CPU 200. These components are well understood in the art.

Each RDU 100, although structurally the same, is unique in the communications network 24 after it is configured with an associated address stored in the CMOS static memory.

As mentioned above, the RDU 100 can provide control for power equipment. For instance, one control function which can be provided by the RDU 100 is for overload protection of a distribution line at a substation or at other remote locations. The various types of power equipment are usually protected for overload and fault conditions by monitoring the current in the equipment. A typical method of monitoring this current is with a current transformer which steps down the current in the primary (normally in the range of 100 to 3000 amps) to a secondary current in the range of 5 amps. The secondary current is monitored with protection equipment, usually involving transducers installed in one leg of the secondary of the protection circuit current transformer.

The clamp-on CTs 140A–C or other current monitoring transformers or transducers can connect to one leg 144A, 144B, 144C of the secondary side of the protection circuit current transformer connected to each phase of the power equipment. Once the CTs 140A–C or other current monitoring devices are installed, legs 144A–C of the protection circuit monitored (passing through the aperture 232) function as the primary for the CTs 140A–C. Thus, a current, scaled down (by a factor of 10,000 in the present embodiment) corresponding to current detected in the protection circuit is provided to the secondary of the transformer via the connectors of the CTs.

A detectable voltage is provided by connecting a resistance (e.g., effectively 2 kohms in the present embodiment) in series with the secondary of the clamp-on CTs 140A–C (e.g., attaching a resistor between the two connectors). Upon installation, the analog voltage signals from the CTs 140A–C are calibrated by using a potentiometer (not shown) to maintain repeatable accuracy in the system. The analog voltage signals from the clamp-on CTs 140A–C are provided to the A/D converter 150 which converts the voltages into digital form upon request from the CPU 200. The CPU 200 reads the digitized signals from the conventional data bus 203. Because the resistance across the clamp on CT 140A–C is known, the current corresponding to the measured voltage is calculated as well understood in the art.

If an overload is detected, the RDU can trip a breaker using one of the digital outputs 116. Methods of using a digital output to control an analog switch are well understood, and depend upon the particular application of control desired.

The RTU

In one exemplary embodiment, the remote terminal unit (RTU) 104 performs the following primary functions: poll the RDUs 100 for data, communicate with other monitor and control systems in the power distribution system 10, communicate with a remote computer such as the host computer 30 and provide the host computer 30 with the data obtained from the RDUs 100 upon request. In a preferred embodiment, the RTUs 104 can also communicate with other controllers in the system, such as the pole switch controller 110, other RTUs, and capacitor controllers 111.

Communications can take place over the communications link 102. However, the communications between the remote terminal unit 104, the pole switch controllers 110 and the capacitor controllers 111 may take place over a different communications link than the communications link 102 between the RTU 104 and RDU 100. For instance, the remote terminal unit 104 may communicate to a pole switch controller 110 via a radio communications link and with a remote data unit 100 over a local area network. Alternatively, the pole switch controller 110 may communicate with the local area network 102 via a radio communications interface between the local area network 102 and the pole switch controller 110. In such an embodiment, the remote terminal unit 104 addresses the pole switch controller 110 as if it were simply another device on the local area network 102. The local area network would manage the communication to the pole switch controller 110 via the radio interface. Similar configurations are envisioned using telephone line/modem communications interfaces and fiberoptic communication interfaces. Such interfaces can be tied directly into the local area network 102 or can be tied directly into the remote terminal unit 104 and the remote data units 100 over other network systems.

Figure 4:
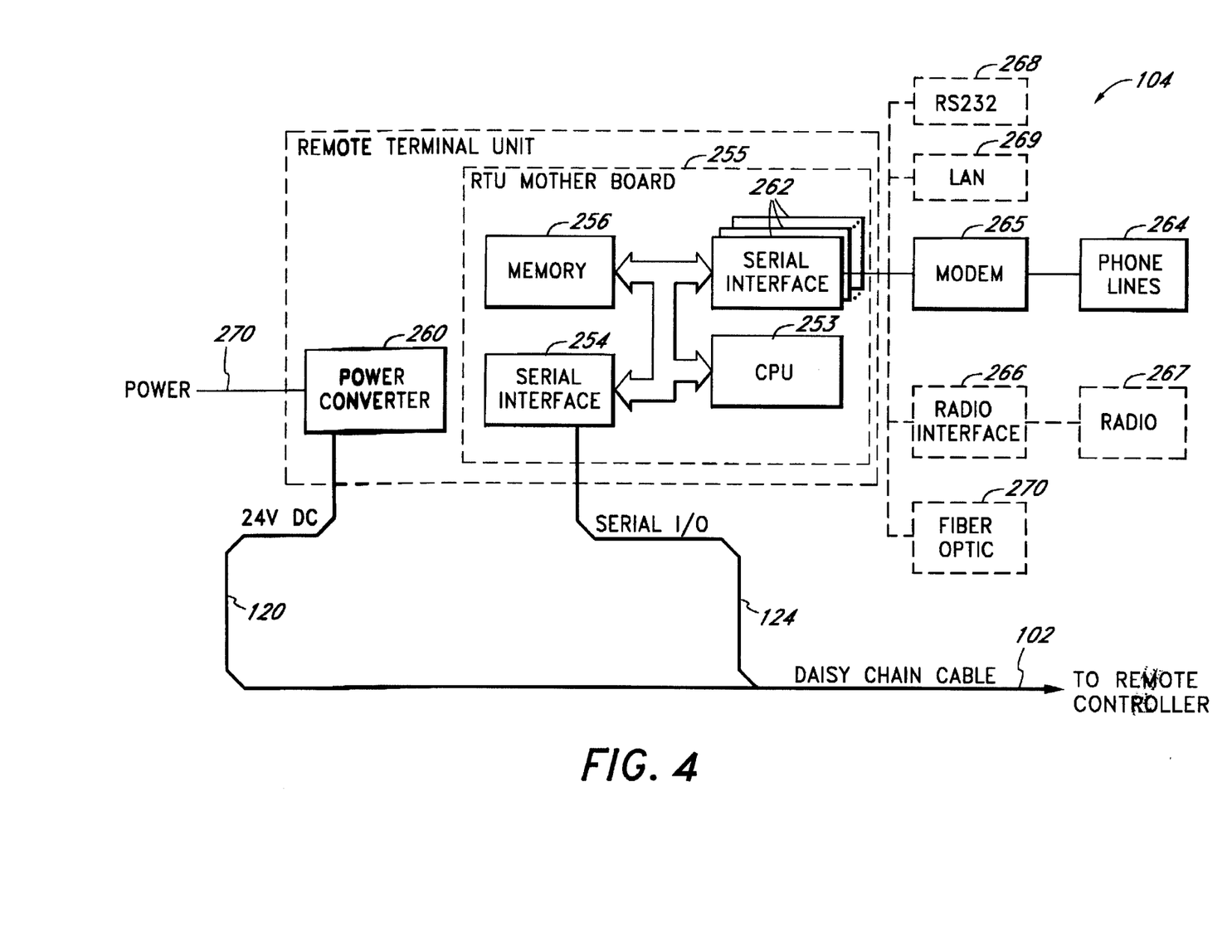
FIG. 4 is a block diagram of an exemplary remote terminal unit (RTU).

Advantageously, the RTU 104 is based around a computer controller 255. The RTU 104 hardware comprises a microprocessor based (e.g., an NEC V25-PLUS) controller 255 with a CPU 253, real time clock (not shown), serial communications channels each with a dedicated serial interface 254, 262, a memory module 256, and a conventional power converter 260. The serial communications channels utilize appropriate dedicated serial interfaces 254 and 262. In the present embodiment, one serial interface 254 connects the RTU 104 to the RDUs 100 via a shared conventional RS-485 link. Other LAN systems are also envisioned. The serial interfaces 262 are used to communicate to an external modem 265, which in turn connects to telephone lines 264 to communicate with the host 30, other controllers in the first monitor and control system 18, and/or other monitor and control systems (e.g., the second monitor and control system 20 and the third monitor and control system 22) in the power distribution system 10. Alternatively, or in addition, the serial interfaces 262 may connect to an RS-232 interface 268, a local area network 269, a fiberoptic communications link 270 or to a radio interface 266 coupled to a radio 267. In essence, communications are envisioned to allow for intercommunications between local and remote control units throughout the monitor and control system 18 and with other monitor and control systems.

An exemplary radio communications link interface advantageously comprises a Metricom® Packet Radio Controller which connects to a Metricom® transceiver. Those skilled in the art will appreciate that other communications links are also appropriate and do not detract from the subject matter regarded as invention. Each RTU 104 uses its communications capabilities to communicate with other RTUs from other monitor and control systems in the power distribution network 10 and to communicate with other controllers (e.g., the pole switch controller 110, the capacitor controller 111, and the RDUs 100) in the monitor and control system 18.

In one embodiment, the power converter 260 converts AC line voltages 270, (which are usually already stepped down somewhat from either a 4 kilovolt or 16 kilovolt (phase to ground) range of the power equipment), to low (e.g., 0–5 volt AC) sense voltages. Alternatively, sense voltages for use by the RTU or by the RDU can be provided independently by a step-down power transformer. In one embodiment, the power converter 260 also provides DC power for the RDUs 100 on signal lines 120.

An A/D converter (not shown) similar to that of the RDU 100 can also be included in the RTU 104 for converting analog data into digital form.

Capacitor Controller

The capacitor controller 111, as depicted in FIG. 2, is provided in the monitor and control system 18 to control the capacitor bank 115 to regulate loads on associated distribution lines. As is well-understood in the art, capacitors in capacitor banks can be switched to add capacitance into individual distribution lines. Some capacitor controllers comprise radio-activated actuators to engage a selected capacitor into the distribution line. Such capacitors do not have distribution line monitoring capabilities. Alternatively, the capacitor controller can be a microprocessor-based controller with its own capacity to make decisions at the local level regarding whether or not a capacitor should be added to a distribution line. In such a case, the capacitor controller 111 is similar to the RDUs 100 with microprocessor control, memory, an A/D converter, serial and parallel interfaces, and digital interfaces for control. However, the RDU configured as a capacitor controller is programmed to perform the capacitor switching functions necessary for capacitor control. In this manner the capacitor controller 110 can monitor the power on the distribution line for a selected capacitor; and if the load in the power line becomes too inductive, the capacitor controller 111 can, on its own decision, switch in a capacitor or remove a capacitor as necessary.

The capacitor controllers 111 further comprise an appropriate communications interface (such as fiberoptic, radio, LAN, RS-232, or modem/telephone line) to facilitate communications with the communications link 102 of the monitor and control system 18.

The capacitor controllers 111 which are microprocessor-based advantageously communicate with other controllers in the network (including the RDUs 100, other capacitor controllers 111, pole switch controllers 110, and/or remote terminal unit 104) in the monitor and control system 18. In this manner the microprocessor-based controllers correlate their control functions with other microprocessor-based units.

Correlation between the various control units within a given monitor and control system is important in order to properly coordinate control of the power distribution system 10. For instance, if a remote data unit 100 located at a substation senses that a distribution subsystem has become too capacitive, the remote data unit may be able to activate a capacitor remote from the substation. However, the remote data unit at the substation may not be able to resolve from the substation which particular distribution line is best suited to have a capacitance added. In addition, if the capacitor controller 111 is a microprocessor-based controller, the capacitor controller that the RDU may select may have already switched in the capacitor. In such a case, by communication between the RDU 100 at the substation and the capacitor controller 111 at the remote location, the remote data unit can determine to add capacitance elsewhere or understand more specifically where the capacitance should be added in the distribution subsystem. Similarly, capacitor controllers 111 can communicate with other capacitor controllers to control the load on a distribution line. Accordingly, communications with the capacitor controllers in the subsystem enhance the operation and control of a power distribution subsystem.

Because the capacitor controllers 111 are often remote from other controllers in the monitor and control system 18, packet radio is one advantageous means for communication between the capacitor controller 111 and other controllers.

One preferred radio embodiment utilizes a Metricom® packet radio using Metricom's protocol.

Pole Switch Controller

Similar to the capacitor controller 111, in one embodiment, the pole switch controller 110 comprises a device that simply responds to signals from another controller (such as an RDU 100 or an RTU 104) in the monitor and control system 18. In such an embodiment, the pole switch controller 110 is coupled to the monitor and control system communication network 102 as a receiving device. In other words, the pole switch controller 110 receives a control signal from one of the other controllers in the monitor and control system 18 in order to activate a switch on the distribution pole.

Alternatively, the pole switch controller 110 comprises an intelligent controller to monitor distribution line parameters and perform switching functions based upon its own decisions. Regardless, the pole switch controller 110 is in communication with communication network 102 of the monitor and control system 18. If the pole switch controller 110 is a microprocessor-based system, it can be configured similar to the RDU 100 with a memory, an A/D converter, a serial interface, a parallel interface, and a digital interface with control outputs. In addition, the pole switch controller 110 comprises an appropriate communication interface (e.g., fiberoptic, radio, LAN, RS-232, modem/telephone line) to facilitate communications to the communications link 102 of the monitor and control system 18. As with the capacitor controller, the pole switch controller 110 can communicate and coordinate with other control units (including other pole switch controllers) in the monitor and control system 18 in order to properly control the power distribution system 10.

As with the capacitor controller 111, because the pole switch controllers 110 are generally remote from other controllers in the monitor and control system 18, a radio communications interface is a particularly advantageous means for communications between the pole switch controller and the other controllers in the control network.

System Firmware

Figure 5:
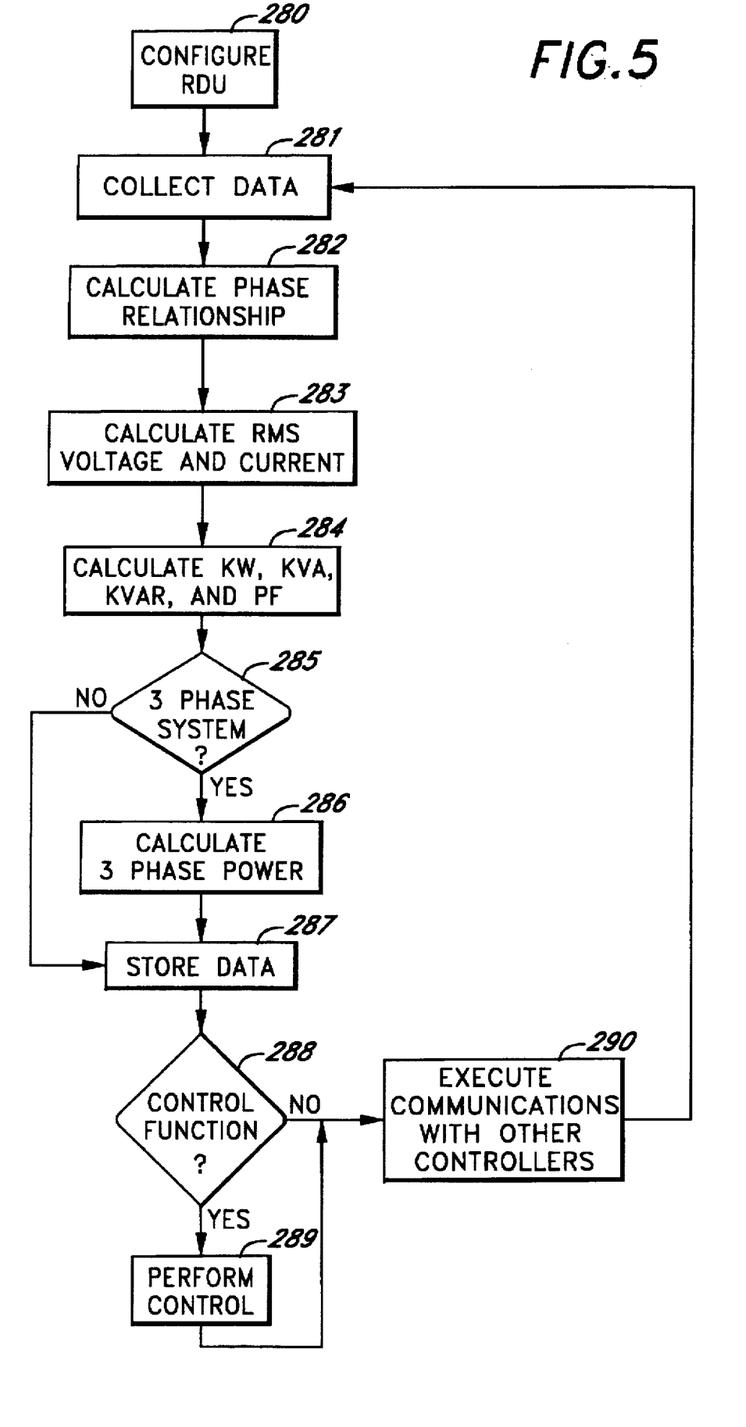
FIG. 5 is an exemplary flow chart for firmware of the RDU.

FIG. 5 is a flow chart of exemplary operations carried out by any RDU 100 configured to operate to monitor a distribution line. The RTU 104 can also perform many of the same functions, but generally leaves these functions to the RDUs 100–100C. The capacitor controllers and pole switch controllers execute as much processing at the local controller level as possible, with reporting to other controllers as necessary. In general, the RDUs 100–100C acquire sample data representing values for voltage and current for a respective power equipment line, and analyze the data. The RTU 104 performs primarily the functions of obtaining data from the RDUs 100–100C, communicating with other monitor and control systems in the power distribution network, and communicating with the host computer 30.

Configuration

During configuration operations, as represented in action block 280 (FIG. 5), a user inputs configuration information via the keypad 176. This information is stored in the CMOS Memory 160 of the RDU 100. The RTU 104 executes the same functions. Thereafter, during normal operations, the RDUs 100 and the RTU 104 read their configuration information from their respective memories. For instance, during configuration, the unique address is entered for each RDU. During operation, when a communication request is made to, or a transfer is executed by, these devices, the RDU, or RTU as the case may be checks its address. An RDU 100 or RTU 104 only responds to serial communications requests having associated addresses that match the addresses input for that RDU 100 or RTU 104. The pole switch controllers 110, capacitor controllers 111, and any other control units in the control system also have unique network address for communication purposes.

In one embodiment of the RDU 100, the keypad 176 is also used to input configuration information about the type of power equipment line which is monitored by the RDU 100 and any other configuration information as further described in U.S. patent application Ser. No. 08/012,280.

Data Collection and Analysis by the RDU

Once configuration of the RDUs 100 and the RTU 104 is complete, the RDUs 100 begin data collection and analysis.

Data sampling is represented in action block 281 of the flow chart of FIG. 5. During data sampling, the A/D converter 150 samples the low voltage sense signals on signal lines 122 and signals from the clamp-on CTs 140A–C at a frequency sufficient to determine the phase angle between the voltage and the current waveforms. Additional information on the details of sampling is contained in U.S. patent application Ser. No. 08/012,280. The two channels accepting signals representing the current and voltage sine waves from a respective power equipment line are sampled in tandem. The sampling rate provides sufficient information for the RDU 100 to determine the magnitude of the voltage and the current, and also to calculate the phase angle between the voltage and current in the power equipment.

Analog-to-Digital Data Processing

Typically, the data sampled from the A/D represents real time signals from AC sine waves for current and voltage. Current and voltage sine waves from the same power line are related by the phase relationship between these sine waves. The determination of an accurate phase relationship, as represented in action block 282, involves a number of steps. One method of calculating the phase relationship along with additional information is disclosed in U.S. patent application Ser. No. 08/012,280, filed Feb. 1, 1993. Other methods of calculating voltage and current, and of determining the phase relationship between the voltage and current utilizing a digitized representation of an AC waveform are known in the art.

Computing Values

The RDU 100, having read the digitized values of the voltage signals and the digitized values of signals representing current from the A/D converter 150, and having determined the relative phase angle between the voltage and current, calculates values corresponding to the RMS voltage and current, the watts (W), volt-amperes (VA), volt-amperes-reactive (VAR) and the power factor (PF), as represented in the action blocks 283 and 284 (FIG. 5). If an RDU 100 is monitoring a three-phase power equipment line, then it also calculates three-phase power and the neutral current, as represented in decision and action blocks 285–286 (FIG. 5).

The RDUs 100 store the data acquired and the calculation results in its memory 160, as represented in action block 287.

Once the RDUs 100 have stored the data acquired, the RDUs determine whether any control functions are necessary, as represented in decision block 288. A control function would normally be carried out utilizing the digital I/O interface 190 of the RDU 100. In one embodiment, the digital interface 190 has 12 digital inputs and 12 digital outputs. An exemplary use for the digital inputs is to monitor circuit breaker status in the substation. Two digital inputs can be used for each circuit breaker. One digital input to indicate that a selected circuit breaker (not shown) is open and one input to indicate that the selected circuit breaker is closed. The digital outputs of the digital interface 190 can be used to perform other control functions as may be needed throughout the substation. The RTU 104 has similar capabilities.

If a control function is necessary, then the RDU 100 performs that control function, as represented in action block 289. If no control functions are currently being requested from the RDU 100, the RDU 100 executes any communications commands, as represented in action block 290. These communications comprise communications with other controllers within the power distribution system monitor and control system 18. For instance, communications may be completed with other RDUs 100, with a pole switch controller 110, with a capacitor controller 111, with the remote terminal unit 104, or with any other controller in the monitor and control system 18.

Once all of these functions are carried out by the RDU 100, the sequence of data acquisition, analysis, and executing other operations is repeated.

Interrupt-Driven Tasks

The RDU 100 also accepts interrupt-driven tasks which occur asynchronously to the main tasking as explained above.

For instance, the CPU clock is configured to interrupt the CPU 200 once every second. The system maintains a one-second counter which measures the seconds elapsed since January 1 of a selected year. The serial I/O interfaces 172 provide another interrupt. Whenever the RDU 100 receives or transmits a character via its serial I/O interface 172, an interrupt is generated. This interrupt causes the next character to be sent or stored in memory 160 by the CPU 200. At the end of the transmission or reception of data, the serial interface sets a flag for the CPU 200 indicating that the transmit buffer has been sent or that a receive buffer is available. This serial interface protocol is well understood in the art.

Communications Capability

In one embodiment, the RDU 100 communicates with the RTU 104 via a serial communications multidrop interface well understood in the art. Data transfers are carried out using eight-bit protocol as well understood in the art. All RDUs 100 connected to one RTU 104 communicate over this local area network (LAN) 102 where communications are multidropped over the same wire. Thus, the RTU 104 transmits and receives, and the RDUs 100 transmit and receive over one pair of wires. The resulting system is a peer-to-peer communications structure as well understood in the art. The RDUs 100 collect and analyze large amounts of data as explained above, which they transmit to the RTU 104 upon request.

In the present embodiment, communications between the RDUs 100, the RTU 104, and any other controllers in the control system 18, and between the RTU 104 and the host 30 advantageously adhere to the NetCom protocol proprietary to the Metricom Corporation. However, other protocols well understood in the art for communications in a LAN are also appropriate for use with the system and do not detract from the subject matter regarded as invention.

The RTUs 104 also communicate over the communications link 24 with neighboring monitor and control systems, just as the RDUs 100 communicate peer-to-peer with other RDUs, the capacitor controllers 111 and with the pole switch controllers 110.

The capacitor controller 111, as explained above, can be a distributed intelligence controller or can be a controller that simply responds to commands from another controller in the system. If the capacitor controller 111 is an intelligent distributed processing and control system, the controller 111 may be similar to the RDU, with the capability of monitoring the power on a power distribution line. The capacitor controller 111, however, would be programmed to monitor the load conditions on the power line and adjust the capacitance by adding or removing capacitors, depending upon the load exhibited on the power line. The capacitor controller 111, in turn, communicates with other capacitor controllers in the monitor and control system 18 and with other RDUs and the RTU in the monitor and control system 18.

Similarly, the pole switch controllers 110 using microprocessor based systems similar to the RDUs 100 can be configured to monitor the power equipment on the distribution pole and utilize the data to make local control decisions, and communicate the data to other controllers in the control network 18. As explained above, this results in a peer-to-peer communication LAN for the control network 18.

RTU Specific Firmware

Figure 6:
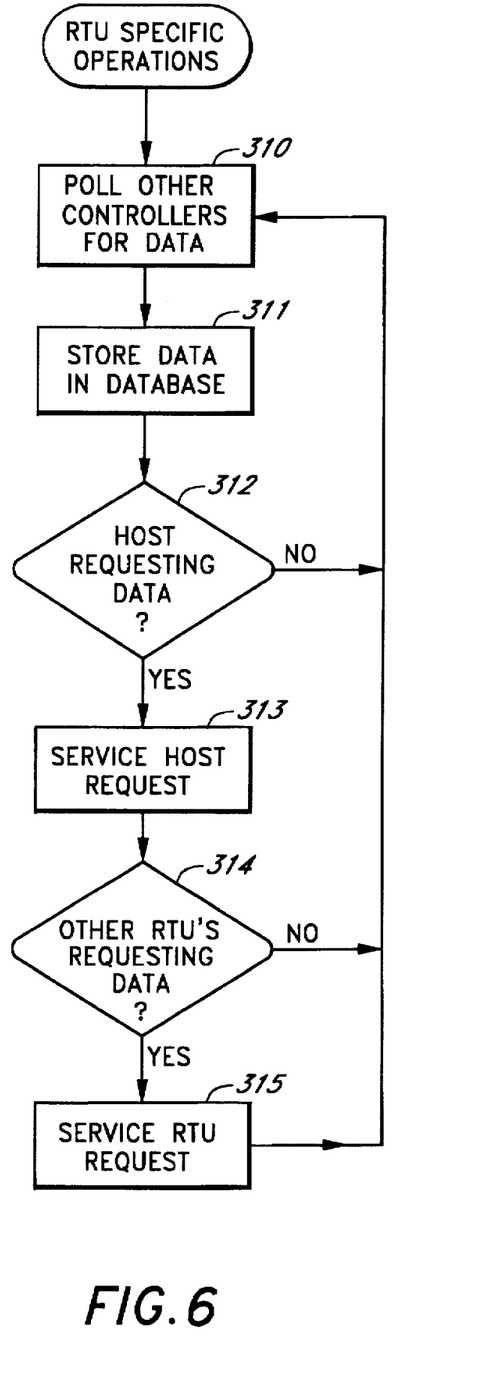
FIG. 6 is an exemplary flow chart for firmware of the RTU.

As depicted in the flow chart of FIG. 6, the RTU 104 is programmed to perform a number of functions that the RDUs 100 do not generally perform. The RTU 104 polls the RDUs 100 and any other control units (e.g., the pole switch controller 110 and the capacitor controller 111), as represented in action block 310, to obtain the data collected and processed by the other control units. The RTU 104 stores this data in a database, as represented in action block 311. The RTU 104 provides this data to the host 30 upon request via the communications link 24 (FIG. 1), as represented in decision block 312 and action block 313.

As discussed above, the remote terminal unit 104 communicates with other remote terminal units in neighboring monitor and control systems, as represented in a decision block 314 and an action block 315. All the RTUs also can be connected to the host computer 30 over the communications link 24, such as a local area network or other communications system. Accordingly, the host computer 30 can collect information and, if necessary, initiate control sequences for an entire power distribution network by correlating the information from several monitor and control systems for each power subsystem within the power distribution network.

Remote RDU Configuration

Figure 7A:
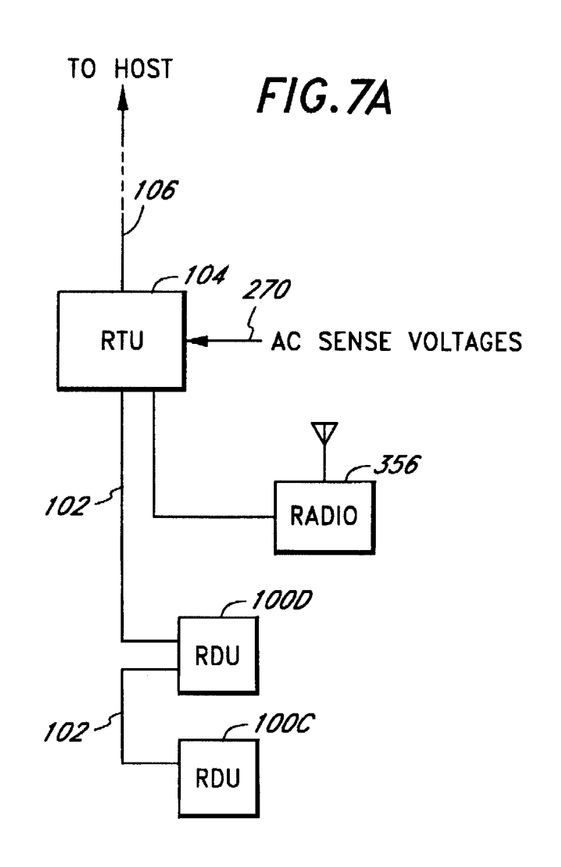
FIGS. 7A–7D are block diagrams showing an embodiment with RDUs and other controllers operating remote to a central monitor and control combinational system.

The present invention can also be implemented without an RTU 104 for each power subsystem, as illustrated in FIGS. 7A–7D. In one embodiment, the RDUs 100–100B still form a daisy chained network, and a local step-down power converter/supply 350 (FIG. 7B) accepts the sense voltages from the power equipment on lines 272 and converts these to low (e.g., 0–5 volts) AC sense voltages accepted by RDUs 100. The local power supply 350 accepts station power on line 352 and provides the DC power for the RDU 100 power supply 130 (FIG. 2). The data collected and calculated by the RDUs 100, 100A and 100B (FIG. 7B) is transmitted to a remote RTU 104 (FIG. 7A) via a radio transmitter 354, or other communications link. The RTU 104 then receives the signals from the remote RDUs 100 via a radio 356. The RTU 104 may also monitor other RDU 100 devices locally, as shown in FIG. 7A (e.g., RDU 100C and 100D).

Figures 7B, 7C, 7D:
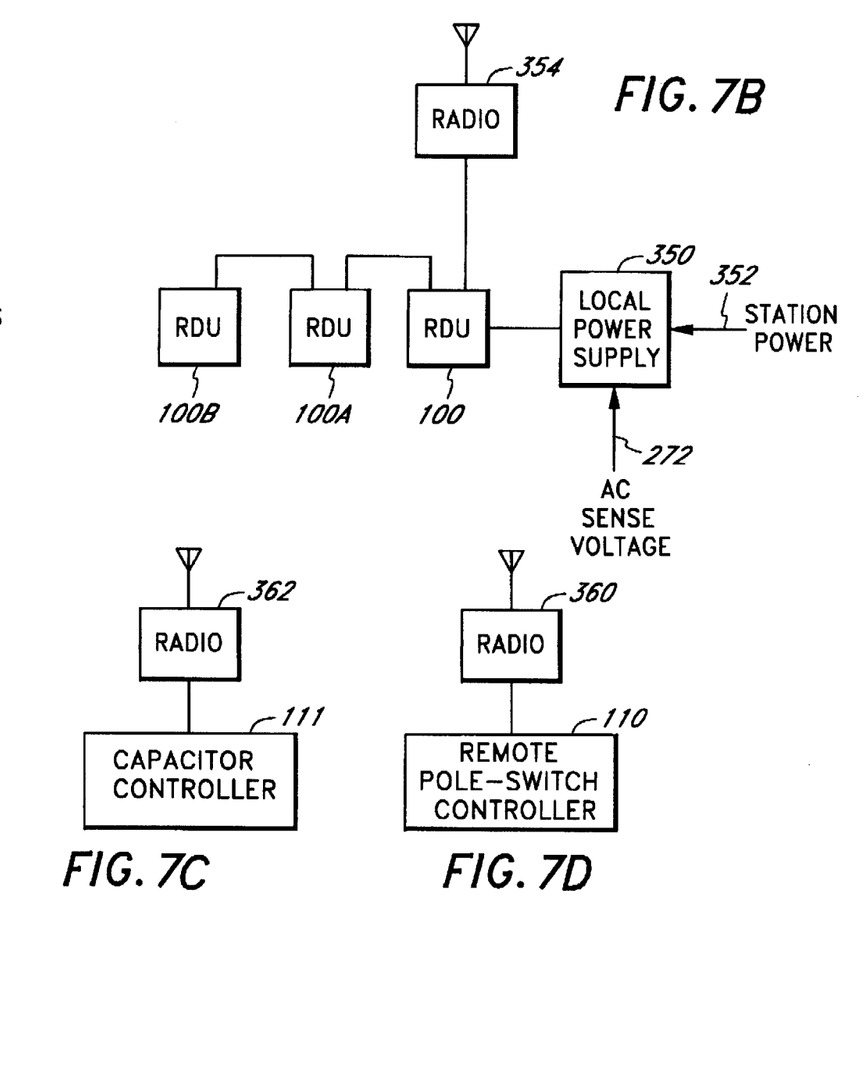

Similarly, the capacitor controllers 111 and the pole switch controllers 110 can be located remotely and communicate with a remote data unit 100, as in FIG. 7B, via a radio 360, 362. The RDU communicating with the pole switch or capacitor controllers may, in turn, transmit information to the RTU 104 (FIG. 7A). Alternatively, the capacitor controllers 111 and remote pole switch controllers 110, as in FIG. 7C and 7D, can communicate directly each other, with other RDUs 100, and with the RTU 104 via their radio interface or other communication system.

Although the preferred embodiment of the present invention has been described and illustrated above, those skilled in the art will appreciate that various changes and modifications to the present invention do not depart from the spirit of the invention. Accordingly, the scope of the present invention is limited only by the scope of the following appended claims.

What is claimed is:

1. A control network for a power distribution system having at least one distribution subsystem, said control network comprising:

a plurality of control units distributed at control locations throughout the power distribution system, at least one of said plurality of control units comprising a substation data acquisition controller which monitors power equipment at a substation within the power distribution system, said data acquisition controller having an analog-to-digital converter which receives signals from A.C. waveforms for current and voltage within a power line of said power distribution system, a memory device and a central processing unit to control said data acquisition controller, said at least one control unit determining the voltage and current in said power line; and a microprocessor-based system controller comprising a central processing unit, a plurality of communications channels with an interface and a memory module, wherein one of said interface connects said system controller to said plurality of control units via a shared communications link.

2. The control network of claim 1, said data acquisition controller further comprising a memory mapped keypad interface coupled to a 12-key keypad, and a memory mapped display interface coupled to a 2-line liquid crystal display to receive configuration information for said data acquisition controller.

3. The control network of claim 1, wherein said shared communications link is a radio interface coupled to a radio.

4. The control network of claim 1, wherein said shared communications link is a fiberoptic communications link.

5. The control network of claim 1, wherein at least one of said plurality of control units comprises a capacitor controller in communication with and responsive to said at least one substation data acquisition controller to control at least one capacitor in a capacitor bank in the power distribution system.

6. The control network of claim 5, wherein said capacitor controller comprises at least one radio-activated actuator to engage a selected capacitor in said capacitor bank into said power line of said power distribution system.

7. The control network of claim 5, wherein said capacitor controller is microprocessor-based to communicate with and to correlate control functions with other control units in said control network.

8. The control network of claim 7, wherein said capacitor controller communicates with said other microprocessor-based controllers by radio.

9. The control network of claim 1, wherein at least one of said plurality of control units comprises a pole switch controller located at a distribution pole, said pole switch controller responsive to and in communication with said substation data acquisition controller to control a switch on said distribution pole.

10. The control network of claim 9, wherein said pole switch controller comprises an intelligent controller which monitors distribution line parameters and performs switching functions based upon its own decisions.

11. The control network of claim 9, further comprising a central computer in communication with said system controller via a second communications link.

12. The control network of claim 11, wherein said second communications link comprises a local area network.

13. The control network of claim 11, wherein said second communications link comprises a radio communications link.

14. A control network for a power distribution system having at least one distribution subsystem, said control network comprising:

a plurality of control units distributed at control locations throughout the power distribution system, at least some of said plurality of control units comprising power equipment controllers which monitor power equipment within the power distribution system, said control units comprising a microprocessor based central processing unit, monitoring inputs, control outputs and a memory; and a system controller in communication with said plurality of control units to provide coordinated control of said power distribution system.

15. The control network of claim 14, wherein said substation data acquisition controller further comprises a memory mapped keypad interface coupled to a 12-key keypad and a memory mapped display interface coupled to a 2-line liquid crystal display, said keypad for inputting configuration information for said data acquisition controller.

* * * * *

UNITED STATES PATENT AND TRADEMARK OFFICE
CERTIFICATE OF CORRECTION

PATENT NO. : 5,694,329
DATED : December 2, 1997
INVENTOR(S) : Lawrence A. Pomatto It is certified that error appears in the above-identified patent and that said Letters Patent is hereby corrected as shown below:

Title page, item [57], Abstract, line 9, replace "provide" with --provides--.

Signed and Sealed this

Second Day of June, 1998

Attest:

Attesting Officer

BRUCE LEHMAN

Commissioner of Patents and Trademarks